March 23, 1937. A. PÓR 2,074,806

PROCESS FOR THE EXTRACTION OF CADMIUM

Filed April 20, 1936

Inventor:
Aladár Pór

Patented Mar. 23, 1937

2,074,806

UNITED STATES PATENT OFFICE 2,074,806

PROCESS FOR THE EXTRACTION OF CADMIUM

Aladár Pór, Duisburg-Wanheim, Germany, assignor to "Berzelius" Metallhutten-Gesellschaft mit beschrankter Haftung, Duisburg-Wanheim, Germany Application April 20, 1936, Serial No. 75,498
In Germany April 25, 1935

7 Claims. (Cl. 75—71)

This invention relates to a process for the recovery of cadmium.

Cadmium sponge produced from solutions containing cadmium sulphate by precipitation by means of zinc has been treated by drying said sponge, mixing it with caustic soda and reducing carbon, and melting the mixture. In this process the cadmium separates more or less completely in molten form from the carboniferous caustic soda fusion. However, this process involves considerable loss of cadmium. In addition it is difficult to obtain the cadmium in a sufficiently pure form. As is well known, commercial cadmium is required to have a purity of at least 99%, and it can be sold with increasing ease the more its purity exceeds this minimum, although the latter is but seldom attained by the known process. In addition, this process necessitates a very large consumption of caustic soda.

It is the aim of the present invention to obviate the foregoing drawbacks, and to this end, in accordance therewith, the bulk of the water or solution remaining in the cadmium sponge, which has been extracted—preferably in a state in which it is as free as possible from lead—by precipitation by means of metals, such as zinc, aluminium or the like, is first removed by pressing or centrifuging for example, the sponge being then introduced while still damp into a caustic alkali fusion, in which it is melted and purified.

Owing to the fact that in accordance with the present invention the cadmium sponge is freed from the bulk of the still adhering water or solution from the process of manufacture, but is nevertheless plunged into the caustic alkali fusion while still moist, it is thus possible to avoid any oxidation of the cadmium sponge that occurs when same is dried, and the dried sponge subjected to fusion with caustic alkali. The avoidance of the oxidation of the cadmium sponge affords the advantage that the action of reducing carbon is superfluous in fusing with caustic alkali, since if reducing carbon be added to the caustic alkali, said carbon has not in any case such a powerful reducing action that all oxidic cadmium compounds present in the dried cadmium sponge can again be reduced. Part of the oxides remains in the caustic alkali melt, from which they can only be extracted again with great difficulty. The addition of reducing carbon to the caustic alkali has moreover the disadvantage that the reaction between the caustic alkali and the impurities that are still contained in the cadmium sponge is incomplete. Furthermore the addition of reducing carbon renders the alkali melt viscous, necessitating a high consumption of caustic alkali. The adding of the cadmium sponge to the caustic alkali melt in a still moist condition also affords the advantage that the melt will not solidify on contact with the cold sponge, the caustic alkali, on the contrary, avidly absorbing the water contained in the cadmium sponge. At the same time, the absorption of water depresses the melting point of the caustic alkali, heat being evolved. Any formation of a crust on the freshly introduced sponge is thus avoided, the entire surface thereof being thus exposed in the most favourable way, immediately after being placed in the melt, to the action of the caustic alkali.

In order to prevent frothing over of the melt on the immersion therein of the still moist sponge, the pieces, for example pressed pieces of cadmium sponge, formed during the removal of the bulk of the water, by compressing the cadmium sponge, are placed in an iron container with perforated walls, which is suspended over the melting pot, the sponge being dipped into the melt while in this container. If excessive frothing occurs during the reaction, the container is partially or entirely withdrawn from the melt, until the frothing has subsided. Oxidation of the cadmium sponge in the container cannot occur, even if the latter be taken out of the melt entirely for a time, since the cadmium sponge is coated with the caustic alkali melt, which protects it from contact with the air.

During the action of the caustic alkali melt on the cadmium sponge the residues in the sponge of the metal used for the precipitation, for example zinc, are completely absorbed by said melt. In addition sulphur, arsenic, iron, and to a certain extent copper also, are removed. Furthermore residues of refractory ceramic materials, such as silica and chamotte, which are often contained in the cadmium sponge, are absorbed by the melt. Lead on the other hand, is not absorbed.

In order to obtain cadmium free from lead, the present invention therefore also provides for the removal of the lead from the cadmium sponge during the manufacture of the latter as completely as possible, and for preventing the cadmium sponge from having any opportunity during its manufacture of absorbing lead. If cadmium is to be extracted from plumbiferous raw materials, it is dissolved out of these materials with dilute sulphuric acid. The solution is clarified by being left to stand, centrifuging, filtration, and the like, so that it no longer contains solid substances and in particular lead sulphate, the cadmium being thereupon precipitated from the solution by refined zinc. If the precipitation be effected in lead tanks, the lower part of these tanks, in which the cadmium sponge collects, is preferably lined with masonry. The object of this precaution is to prevent the cadmium sponge from coming into contact with the lead walls of the tank when agitated by the stirrer, for if the sponge should be moved by the stirrer or the like over a lead lined surface, it could absorb considerable quantities of lead.

If the cadmium sponge be extracted from starting materials that are free from lead, for example from the cadmium powder that is obtained in plants for the manufacture of refined zinc by fractional distillation, for example in accordance with the process of the New Jersey Zinc Company, then it is unnecessary to dissolve all the cadmium in the powder. The powder, which mainly contains metallic cadmium and metallic zinc together with oxides of these metals, is treated with dilute lead-free sulphuric acid in a tank fitted out in a similar manner to that used for treating cadmium raw materials containing lead. The cadmium is then partially converted to sponge, while the rest of it and the bulk of the zinc is dissolved. The dissolved cadmium is then precipitated by refined zinc. The use of refined zinc prevents any lead from gaining access to the cadmium sponge through the metal used for the precipitation.

A detailed example of the present process in application to the extraction of metallic cadmium from raw materials containing no lead is given in the following and with reference to the accompanying drawing, which illustrates diagrammatically and by way of example, embodiments of apparatus suitable for carrying the invention into practical effect:

Powder containing cadmium produced in a refined zinc plant, and containing

Figure 2:
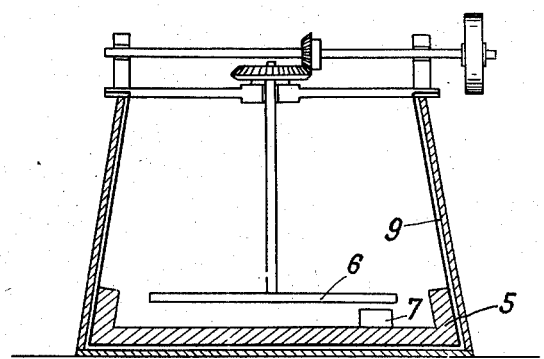
Fig. 2 shows a tank for treating the starting material.

| | Per cent |
|---|---|
| Cadmium | 20–40 |
| Zinc | 60–40 |
| Pb | 0.03 |
| Sb | 0.007 |
| Fe | 0.021 |
| Cu | 0.002 |
| As | 0.0001 |
| Sn | 0.005 |
| Insoluble residue | 2–3 | is treated in the tank shown in Fig. 2 with dilute sulphuric acid, of for example 18° Bé. This tank, which has a lead lining 9 and the lower part of which is protected on the inside by the brickwork or masonry 5, is fitted with a stirrer 6 which is operated by the driving mechanism 8. The sulphuric acid must be free from lead sulphate and other lead compounds, as these would otherwise be absorbed by the cadmium sponge and reappear as lead in the cadmium metal. In the course of about 2 hours cadmium sponge will have formed on the floor of the tank. The solution is then neutralized with cadium powder containing no lead.

Refined zinc plates are thereupon suspended in the solution, and the cadmium is precipitated while the stirrer is operated slowly. When the precipitation is complete and the cadmium sponge has to some extent separated from the solution, the latter is run off into another tank. The sponge is then washed with water about twice, and carried by a powerful jet of water through the opening 7 in the tank wall into a collecting tub. In the latter the cadmium sponge quickly settles, and the overlying clear water is drawn off until the sponge is just covered with water. The washing water is added to the solution drawn off from the cadmium sponge. The quantity of sulphuric acid used for the treatment of the cadmium powder is controlled approximately in such a manner that the solution separated from the cadmium sponge contains 100–120 grams of zinc in the form of zinc sulphate. By diluting the solution with the washing water, the residue of cadmium sponge still suspended in the solution is quickly made to settle on the floor, and can easily be extracted. The cadmium sponge in the collecting tub contains about 60% of water. By pressing, for example in a hand-press, pressed pieces of suitable size are produced, which still contain about 20% of water. The cadmium sponge separated from the diluted zinc sulphate solution will naturally be treated in the same way. The composition of the pressed pieces is approximately as follows:—

| | Per cent |
|---|---|
| Cd | 60 |
| Zn | 10 |
| H₂O | 20 |
| SO₄ | 5 |
| Insoluble residue | 4 |
| Fe+As+Sb+Cu+Pb | 1 |

The reduction of the water content of the cadmium can also be effected in a different way, for example by centrifuging.

It is not absolutely necessary to wash the cadmium sponge after separation from the zinc sulphate solution, or to adhere to the foregoing concentrations of zinc sulphate in the solution.

Figure 1:
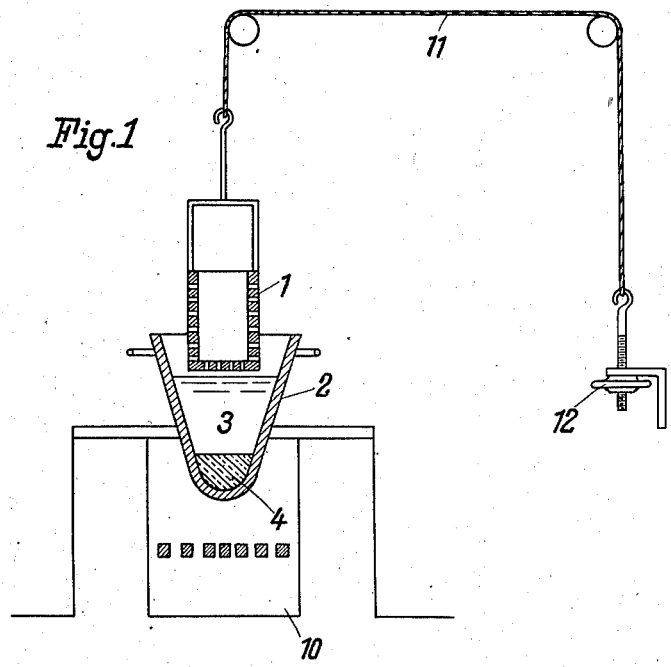
Fig. 1 shows a crucible and container for the fusion.

The pressed cadmium sponge is then subjected to treatment with caustic alkalis. Caustic soda is generally used for this purpose, because it is considerably cheaper than other caustic alkalis. The caustic soda is melted down in the iron crucible 2 shown in Fig. 1, the crucible being placed in a furnace 10 in known manner. Above the iron crucible is mounted the container 1, the walls of which are perforated, this container being attached to a cable 11 and capable of being raised and lowered, for example by means of the hand-wheel 12. In this container is placed a suitable quantity of the pressed pieces of the cadmium sponge, which have been first broken into smaller pieces in order to improve the action of the caustic alkali. The container is thereupon slowly lowered into the melt. The reaction is at first fairly vigorous, so that in order to avoid frothing over, the container must be withdrawn from the melt several times. The caustic alkali melt gradually absorbs the sponge, during which process the zinc and other impurities pass over into the melt mainly in the form of oxides, while the cadmium collects on the bottom of the crucible in a molten state. If the cadmium sponge is not washed or only slightly washed, so that it still contains zinc sulphate, then the zinc sulphate is of course also absorbed by the caustic alkali melt.

The absorption of the cadmium sponge by the melt can also be further facilitated by stirring the contents of the container with an iron rod or the like.

If the melt should become too hot during the process, so that it begins to froth again or the cadmium begins to evaporate, then the container holding the remainder of the cadmium sponge is again withdrawn from said melt. The container then cools off quickly above the melt, and when it is replaced therein after some time, it reduces the temperature of the melt at the same time, so that accidental over-heating of the melt can in this way be rendered harmless.

If the sponge contains a great deal of impurities, the caustic alkali melt may become thick in consistency. It is then advisable to add a little more caustic soda to the melt, thus reducing its viscosity, and producing as complete as possible a separation of the metal from said melt. If the melt still remains very thin in consistency after the absorption of the sponge, then further sponge can be placed in the iron container and treated as hereinbefore described.

When all of the cadmium sponge has been absorbed into the melt, the latter and the molten metal can be poured out of the crucible separately. However, in order to prevent endangering the workmen by spraying with the caustic alkali, it is more advisable to allow the melt and the metal to solidify in the crucible, and to tilt the latter after cooling has proceeded sufficiently. The solidified melt 3, and the regulus 4 of metal can thereupon be easily removed from the crucible. The regulus is washed and dried, and worked up into the usual ingots or bars of commerce by remelting in paraffin. The solidified melt, is dissolved in water in order to extract any pellets of cadmium that may be still contained therein. These are united to form a regulus with the aid of a little caustic soda, this then being brought into the usual commercial shapes in the same way. The purity of cadmium extracted in this way is as a rule 99.7% or over.

The caustic soda solution can if desired be treated to recover the caustic soda and the zinc and the like that it contains. From the zinc sulphate solution resulting from the extraction of the cadmium sponge, the zinc sulphate can be extracted in marketable condition by crystallization, or this solution can be used for zinc extraction, if for example zinc ore is damped with it before roasting.

For the process according to the invention the caustic alkali consumption required amounts to only about 1 to 1½ times the weight of the cadmium extracted. Instead of zinc it is also possible to use other metals, for example light metals, such as aluminium, or iron for the precipitation of the cadmium sponge.

I claim:

1. Process for the recovery of metallic cadmium which comprises plunging a mass of moist cadmium sponge at least partially into a molten body of caustic alkali, withdrawing the mass at least partially from the molten body, and repeating this sequence of operations.

2. Process as defined in claim 1 in which the mass of cadmium is periodically immersed into and withdrawn from the body of caustic alkali and the foaming of the molten body of caustic alkali is controlled by adjusting the periods during which the mass of cadmium sponge is held in and out of the body of caustic alkali.

3. Process as defined in claim 1 in which the foaming of the molten body of caustic alkali is controlled by controlling the extent of contact between the mass of cadmium sponge and the molten body.

4. Process as defined in claim 1 in which the mass of cadmium sponge is formed and partially freed from adhering liquid by compacting wet treated cadmium sponge.

5. Process as defined in claim 1 in which the mass of cadmium sponge is formed and freed from liquid so that it contains not more than 20% by weight of liquid by compacting wet treated cadmium sponge.

6. Process as defined in claim 1 in which the cadmium sponge contains zinc and is substantially free of lead.

7. Process for the recovery of metallic cadmium which comprises plunging a mass of moist zinc-containing cadmium sponge at least partially into a molten body of caustic alkali and withdrawing the mass at least partially from the molten body before excessive frothing thereof occurs.

ALADÁR PÓR.